(12) United States Patent
Lau et al.

(10) Patent No.: US 9,051,198 B2
(45) Date of Patent: Jun. 9, 2015

(54) NITROGEN DOPED $A_2NB_4O_{11}$, PROCESS FOR PREPARATION THEREOF, AND METHOD FOR DEGRADATION OF ORGANIC POLLUTANTS

(75) Inventors: Taichu Lau, Hong Kong (CN); Yongfu Qiu, Hong Kong (CN)

(73) Assignee: CITY UNIVERSITY OF HONG KONG, Hong Kong (CN)

(*) Notice: Subject to any disclaimer, the term of this patent is extended or adjusted under 35 U.S.C. 154(b) by 51 days.

(21) Appl. No.: 13/397,614

(22) Filed: Feb. 15, 2012

(65) Prior Publication Data

US 2012/0205321 A1 Aug. 16, 2012

(30) Foreign Application Priority Data

Feb. 16, 2011 (CN) .......................... 2011 1 0040044

(51) Int. Cl.
| | |
|---|---|
| C01D 17/00 | (2006.01) |
| C02F 1/72 | (2006.01) |
| C01G 33/00 | (2006.01) |
| B01J 37/04 | (2006.01) |
| B01J 37/08 | (2006.01) |
| B01J 27/24 | (2006.01) |
| B01J 35/00 | (2006.01) |
| C02F 1/32 | (2006.01) |
| C02F 101/34 | (2006.01) |

(52) U.S. Cl.
CPC ............. *C02F 1/725* (2013.01); *C01G 33/006* (2013.01); *C02F 1/32* (2013.01); *C02F 2101/345* (2013.01); *B01J 37/04* (2013.01); *B01J 37/08* (2013.01); *B01J 27/24* (2013.01); *B01J 35/002* (2013.01); *B01J 35/004* (2013.01)

(58) Field of Classification Search
USPC ................. 423/68, 265, 385, 594.8; 502/344; 210/748.14
See application file for complete search history.

(56) References Cited

FOREIGN PATENT DOCUMENTS

| GB | 2469285 | * | 10/2010 |
| JP | 2006-088019 | * | 4/2006 |

OTHER PUBLICATIONS

Qiu et al., "Preparation of nitrogen doped K2Nb4O11 with high photocatalytic activity for degradation of organic pollutants" Applied Catalysis A: General 402, Apr. 16, 2011, pp. 23-30.*
M. A. Behnajady, N. Modirshahla, R. Hamzavi, "Kinetic study on photocatalytic degradation of C.I. Acid Yellow 23 by ZnO photocatalyst" J. Hazard. Mater., B 2006, vol. 133, pp. 226-232.
R. Kavitha, S. Meghani, V. Jayaram, "Synthesis of titania films by combustion flame spray pyrolysis technique and its characterization for photocatalysis" Mater. Sci. Eng. B, 2007, vol. 139, pp. 134-140.
P. Pawinrat, O. Mekasuwandumrong, J. Panpranot, "Synthesis of Au—ZnO and Pt—ZnO nanocomposites by one-step flame spray pyrolysis and its application for photocatalytic degradation of dyes" Catal. Commu., 2009, vol. 10, pp. 1380-1385.
X. Zhou, Y. Z. Li, T. Peng, W. Xie, X. J. Zhao, "Synthesis, characterization and its visible-light-induced photocatalytic property of carbon doped ZnO" Mater. Lett., 2009, vol. 63, pp. 1747-1749.
R. A . Damodar, S. J. You, H. H. Chou, "Study the self cleaning, antibacterial and photocatalytic properties of TiO2 entrapped PVDF membranes" J. Hazard. Mater., 2009, vol. 172, pp. 1321-1328.
Huiming Yin, Aiqiu Zhou, Ning Chang, Xiaohong Xu, "Characterization and photocatalytic activity of Bi3TiNbO9 nanocrystallines synthesized by sol—gel process", Materials Research Bulletin 44 (2009) pp. 377-380.
A. Vijayabalan, K. Selvam, R. Velmurugan, M. Swaminathan, "Photocatalytic activity of surface fluorinated TiO2-P25 in the degradation of Reactive Orange 4" J. Hazard. Mater., 2009, vol. 172, pp. 914-921.
L. W. Zhang, Y. J. Wang, H. Y. Cheng, W. Q. Yao, Y. F. Zhu, "Synthesis of Porous Bi2WO6 Thin Films as Efficient Visible-Light-Active Photocatalysts" Adv, Mater., 2009, vol. 21, pp. 1286-1290.
H.Y. Zhu, R. Jiang, L. Xiao, Y. H. Chang, Y. J. Guan , X. D. Li., G. M. Zeng, "Photocatalytic decolorization and degradation of Congo Red on innovative crosslinked chitosan/nano-CdS composite catalyst under visible light irradiation" J. Hazard. Mater., 2009, vol. 169, pp. 933-940.
L. Cakare-Samardzija, B. Malic, and M. Kosec, "K0.5Na0.5Nb03 Thin Films Prepared by Chemical Solution Deposition", vol. 370, Issue 1, 2008, pp. 113-118.
X. Li, N. Kikugawa, J. Ye, "A Comparison Study of Rhodamine B Photodegradation over Nitrogen-Doped Lamellar Niobic Acid and Titanic Acid under Visible-Light irradiation" Chem. Eur. J., 2009, vol. 15, pp. 3538-3545.
H. C. Zeng, and S. K. Tung, "Synthesis of Lithium Niobate Gels Using a Metal Alkoxide-Metal Nitrate Precursor", Chem. Mater. 1996, vol. 8, pp. 2667-2672.
J. Yoshimura, Y. Ebina, J. Kondo, K. Domen, A. Tanaka, "Visible Light Induced Photocatalytic Behavior of a Layered Perovskite Type Niobate, RbPb2Nb3010", J. Phys. Chem., 1993, vol. 97, pp. 1970-1973.

(Continued)

Primary Examiner — Steven Bos
(74) Attorney, Agent, or Firm — Maschoff Brennan (57) ABSTRACT

The present invention relates to nitrogen doped $A_2Nb_4O_{11}$, which is represented by $A_2Nb_4O_{11-x}N_x$, to a process for the preparation thereof, and to a method for degradation of organic pollutants. The nitrogen doped $A_2Nb_4O_{11}$ is a new photocatalyst for the photocatalytic degradation of organic pollutants in the waste water. The $A_2Nb_4O_{11-x}N_x$ catalyst may be prepared by substituting some of the O elements of pure $A_2Nb_4O_{11}$ with N elements, and a process for the preparation thereof comprises a step of doping of nitrogen with a nitrogen source through a solid state reaction. The new nitrogen doped $A_2Nb_4O_{11}$ catalyst having a general formula $A_2Nb_4O_{11-x}N_x$ has a narrower optical bandgap compared to pure $A_2Nb_4O_{11}$, and therefore can be activated under the visible light range and it shows high efficiency in the degradation of organic pollutants.

16 Claims, 9 Drawing Sheets
(8 of 9 Drawing Sheet(s) Filed in Color)

(56) References Cited

OTHER PUBLICATIONS

J. H. Wu, Y. H. Cheng, J. M. Lin, Y. F. Huang, M. L. Huang, S. C. Hao, "Fabrication and Photocatalytic Properties of HLaNb2O7/(Pt, Fe2O3) Pillared Nanomaterial", J. Phys. Chem. C, 2007, vol. 111, pp. 3624-3628.

G. K. Zhang, X. Zou, J. Gong, F. He, H. Zhang, S. Ouyang, H. Liu, "Characterization and photocatalytic activity of Cu-doped K2Nb4O11", J. Molec. Catal. A: Chem., 2006, vol. 255, pp. 109-116.

B. Muktha, G. Madras, T.N.G. Row, U. Scherf, S. Patil, "Conjugated polymers for photocatalysis", J. Phys. Chem. B, 2007, vol. 111, pp. 7994-7998.

P. Mahata, G. Madras, S. Natarajan, "New photocatalysts based on mixed-metal pyridine dicarboxylates", Catal. Lett., 2007, vol. 115, pp. 27-32.

P. Mahata, G. G Madras, S. Natarajan, "Novel Photocatalysts for the Decomposition of Organic Dyes Based on Metal-Organic Framework Compounds", J. Phys. Chem. B, 2006, vol. 110, pp. 13759-13768.

Clara Piccirillo, Russell Binions, and Ivan P. Parkin, "Nb-Doped VO2 Thin Films Prepared by Aerosol-Assisted Chemical Vapour Deposition", European J. of Inorganic Chem., 2007, Issue 25, pp. 4050-4055.

Aylin Sakar-Deliormanli, Erdal Celik and Mehmet Polat, "Phase formation and microstructure of Nd+3 doped Pb (Mg1/3Nb2/3)O3 prepared by sol—gel method", J. of Materials Science: Materials in Electronics, vol. 19, No. 6 (2008), pp. 577-583.

Lifeng Cao, Lingxia Li, Ping Zhang, Haitao Wu, "Synthesis and characterization of sol—gel derived Ag(Nb,Ta)O3 nanopowder", J Sol—Gel Sci Technol (2009) vol. 51:pp. 251-254.

M. B. Telli, S. S. N. Bharadwaja, M. D. Biegalski, J. G. Cheng, and S. Trolier-McKinstry, "(001) epitaxial Ag (Ta0.5) 03 thin fislms on (001) SrRu031(001)LaAlO3 substrates by chemial solution deposition" J. of Applied Physics, (2007) 101,014111.

Jianhui Sun, Liping Qiao, Shengpeng Suna, Guoliang Wang, "Photocatalytic degradation of Orange G on nitrogen-doped TiO2 catalysts under visible light and sunlight irradiation" J. of Hazardous Materials 155 (2008) pp. 312-319.

D. Beydoun, R. Amal, G. K.-C. Low, S. McEvoy, "Novel Photocatalyst: Titania-Coated Magnetite. Activity and Photodissolution", J. Phys. Chem. B, 2000, vol. 104, pp. 4387-4396.

G. K. Zhang, Y. J. Hu, X. M. Ding, J. Zhou, J. W. Xie, "Wet chemical synthesis and photocatalytic activity of potassium niobate K6Nb10. 8O30 powders", J. Solid Sate Chem., 2008, vol. 181, pp. 2133-2138.

T. Shishido, M. Oku, S. Okada, K. Kudou, J. Ye, T. Sasaki, Y. Watanabe, N. Toyota, H. Horiuchi, T. Fukuda, "Chemical state and properties of the Nb Sn Ga grown by the self-component flux method using tin as a solvent", J. Alloy. Comp., 1998, vol. 281, pp. 196-201.

A. Molak, E. Talik, M. Kruczek, M. Paluch, A. Ratuszna, Z. Ujma, "Characterisation of Pb(Mn1/3Nb2/3)O3 ceramics by SEM, XRD, XPS and dielectric permittivity tests", Mater. Sci. and Engi. B, 2006, vol. 128, pp. 16-24.

S.-Y. Lai, Y. Qiu, S. Wang, "Effects of the structure of ceria on the activity of gold/ceria catalysts for the oxidation of carbon monoxide and benzene", J. Catal., 2006, vol. 237, pp. 303-313.

R. Asahi, T. Morikawa, "Nitrogen complex species and its chemical nature in TiO2 for visible-light sensitized photocatalysis", Chem. Phys., 2007, vol. 339, pp. 57-63.

Y. C. Zhu, C. X. Ding, "Investigation on the Surface State of TiO2 Ultrafine Particles by Luminescence", J. Solid State Chem., 1999, vol. 145, pp. 711-715.

C. Yu, J. C. Yu, "A Simple Way to Prepare C—N-Codoped TiO2 Photocatalyst with Visible-Light Activity", Catal. Lett., 2009, vol. 129, pp. 462-470.

Y. Qiu, S. Yang, "ZnO Nanotetrapods: Controlled Vapor-Phase Synthesis and Application for Humidity Sensing", Advanced Functional Materials, 2007, vol. 17, pp. 1345-1352.

J. C. Yu, J. G. Yu, W. K. Ho, Z. T. Jiang, L. Z. Zhang, "Effects of F-Doping on the Photocatalytic Activity and Microstructures of Nanocrystalline TiO2 Powders", Chem. Mater., 2002, vol. 14, pp. 3808-3816.

T. Wu, G. Liu, J. Zhao, H. Hidaka, N. Serpone, "Photoassisted Degradation of Dye Pollutants. V. Self-Photosensitized Oxidative Transformation of Rhodamine B under Visible Light Irradiation in Aqueous TiO2 Dispersions", J. Phys. Chem. B, 1998, vol. 102, pp. 5845-5851.

M. R. Hoffmann, S. T. Martin, W. Y. Choi, D. W. Bahnemann, "Environmental Applications of Semiconductor Photocatalysis", Chem. Rev., 1995, vol. 95, pp. 69-96.

M. Mrowetz, W. Balcerski, A. J. Colussi, M. R. Hoffmann, "Oxidative Power of Nitrogen-Doped TiO2 Photocatalysts under Visible Illumination", J. Phys. Chem. B., 2004, vol. 108, pp. 17269-17273.

X. L. Yan, T. Ohno, K. Nishijima, R. Abe, B. Ohtani, "Is methylene blue an appropriate substrate for a photocatalytic activity test? A study with visible-light responsive titania", Chem. Phys. Lett., 2006, vol. 429, pp. 606-610.

F. Amano, A. Yamakata, K. Nogami, M. Osawa, B. Ohtani, "Visible Light Responsive Pristine Metal Oxide Photocatalyst: Enhancement of Activity by Crystallization under Hydrothermal Treatment", J. Am. Chem. Soc., 2008, vol. 130, pp. 17650-17651.

G. S. Wu, T. Nishikawa, B. Ohtani, A. C. Chen, "Synthesis and Characterization of Carbon-Doped TiO2 Nanostructures with Enhanced Visible Light Response", Chem. Mater., 2007, vol. 19, pp. 4530-4537.

R. Abe, H. Takami, N. Murakami, B. Ohtani, "Pristine Simple Oxides as Visible Light Driven Photocatalysts: Highly Efficient Decomposition of Organic Compounds over Platinum-Loaded Tungsten Oxide", J. Am. Chem. Soc., 2008, vol. 130, pp. 7780-7781.

F. Amano, O.-O. Prieto-Mahaney, Y. Terada, T. Yasumoto, T. Shibayama, B. Ohtani, "Decahedral Single-Crystalline Particles of Anatase Titanium(IV) Oxide with High Photocatalytic Activity", Chem. Mater., 2009, vol. 21,pp. 2601-2603.

K. Nagaveni, M. S. Hegde, N. Ravishankar, G. N. Subbanna, G. Madras, "Synthesis and Structure of Nanocrystalline TiO2 with Lower Band Gap Showing High Photocatalytic Activity", Langmuir, 2004, vol. 20, pp. 2900-2907.

F. Dong, W. R. Zhao, Z. B. Wu, S. Guo, "Band structure and visible light photocatalytic activity of multi-type nitrogen doped TiO2 nanoparticles prepared by thermal decomposition", J. Hazar. Mater., 2009, vol. 162, pp. 763-770.

A. Akyol, H. C. Yatmaz, M. Bayramoglu, "Photocatalytic decolorization of Remazol Red RR in aqueous ZnO suspensions" Applied Catalysis B: Environmental, vol. 54, Issue 1, pp. 19-24, Nov. 30, 2004.

R. Kavitha et al. "Selected Abstracts of Thermal Spray Literature" Journal of Thermal Spray Technology,vol. 16, No. 3, 2007 pp. 449-461.

R. Y. Hong et al. "Synthesis, surface modification and photocatalytic property of ZnO nanoparticles" Powder Technol., 2009, vol. 189, pp. 426-432.

H.Y. Zhu, R. Jiang, L. Xiao, Y. H. Chang, Y. J. Guan , X. D. Li., G. M. Zeng, "Photocatalytic decolorization and degradation of Congo Red on innovative crosslinked chitosan/nano-CdS composite catalyst under visible light irradiation" J. Hazard. Mater., 2009, vol. 169, Abstract.

M. Lundberg, M. Sundberg, "Studies of phases in the KNbO3 Nb2O5 system by high-resolution electron microscopy and X-ray powder diffraction" J. Solid State Chem., 1986, vol. 63, pp. 216-230.

M. Sokmen, A. O zkan, J. Photochem. "Decolourising textile wastewater with modified titania: the effects of inorganic anions on the photocatalysis" Photobiol. A-Chem., 2002, vol. 147, pp. 77-81.

J.M. Kwon, Y.H. Kim, B.K. Song, S.H. Yeom, B.S. Kim, J.B. Im, "Novel immobilization of titanium dioxide (TiO2) on the fluidizing carrier and its application to the degradation of azo-dye" J. Hazard. Mater., 2006, vol. 134, pp. 230-236.

G. Sivalingam, K. Nagaveni, M.S. Hegde, G. Madras, "Photocatalytic degradation of various dyes by combustion synthesized nano anatase TiO2" Appl. Catal. B-Environ., 2003, vol. 45, pp. 23-38.

(56) References Cited

OTHER PUBLICATIONS

C. Hachem, F. Bocquillon, O. Zahraa, M. Bouchy, "Decolourization of textile industry wastewater by the photocatalytic degradation process", Dyes Pigment., 2001, vol. 49, pp. 117-125.

S. Yang, L. Lou, K. Wang, Y. Chen, "Shift of initial mechanism in TiO2-assisted photocatalytic process" Appl. Catal. A-Gen., 2006, vol. 301, pp. 152-157.

K. Nagaveni, G. Sivalingam, M.S. Hegde, G. Madras, "Solar photocatalytic degradation of dyes: high activity of combustion synthesized nano TiO2" Appl. Catal. B-Environ., 2004, vol. 48, pp. 83-93.

S. Mahapatra, G. Madras, T.N. Guru Row, "Structural and Photocatalytic Activity of Lanthanide (Ce, Pr, and Nd) Molybdovanadates" J. Phys. Chem. C, 2007, vol. 111, pp. 6505-6511.

* cited by examiner

NITROGEN DOPED $A_2Nb_4O_{11}$, PROCESS FOR PREPARATION THEREOF, AND METHOD FOR DEGRADATION OF ORGANIC POLLUTANTS

TECHNICAL FIELD

The present invention relates to the field of photo-catalyst, particularly to nitrogen doped $A_2Nb_4O_{11}$, process for preparation thereof, and method for degradation of organic pollutants.

STATE OF THE ART

Organic pollutants in water have been causing serious environmental problems. Photocatalytic degradation of these pollutants using sunlight is an attractive solution to this global problem. At present, the most commonly used photocatalysts are semiconductors, such as ZnO (M. A. Behnajady, N. Modirshahla, R. Hamzavi, *J. Hazard. Mater.*, B 2006, 133 226-232; A. Akyol, H. C. Yatmaz, M. Bayramoglu, *Appl. Catal. B*, 2004, 54, 19-24; R. Kavitha, S. Meghani, V. Jayaram, *Mater. Sci. Eng.* B, 2007, 139, 134-140; R. Y. Hong, J. H. Li, L. L. Chen, D. Q. Liu, H. Z. Li, Y. Zheng, J. Ding, *Powder Technol.*, 2009, 189, 426-432; P. Pawinrat, O. Mekasuwandumrong, J. Panpranot, *Catal. Commu.*, 2009, 10, 1380-1385; X. Zhou, Y. Z. Li, T. Peng, W. Xie, X. J. Zhao, *Mater. Lett.*, 2009, 63, 1747-1749), $TiO_2$ (R. A. Damodar, S. J. You, H. H. Chou, *J. Hazard. Mater.*, 2009, 172, 1321-1328; Z. B. Wu, F. Dong, Y. Liu, H. Q. Wang, *Catal. Commun.*, 2009, 11, 82-86; A. Vijayabalan, K. Selvam, R. Velmurugan, M. Swaminathan, *J. Hazard. Mater.*, 2009, 172, 914-921), $BiWO_6$ (L. W. Zhang, Y. J. Wang, H. Y. Cheng, W. Q. Yao, Y. F. Zhu, *Adv, Mater.*, 2009, 21, 1286+), CdS (H. Y. Zhu, R. Jiang, L. Xiao, Y. H. Chang, Y. J. Guan, X. D. Li., G. M. Zeng, *J. Hazard. Mater.*, 2009, 169, 933-940), $Fe_2O_3$ (E. Rodriguez, G. Fernandez, B. Ledesma, P. Alvarez, F. J. Beltran, *Appl. Catal. B Envir.*, 2009, 92, 240-249), and $HNbO_3$ (X. Li, N. Kikugawa, J. Ye, *Chem. Eur. J.*, 2009, 15, 3538-3545). These semiconductors, however, can only absorb UV light due to their large band gaps. For better utilization of sunlight and indoor illumination, Nb-based photocatalysts have recently been extensively studied because the layered perovskite type niobates can be excited by visible light (X. Li, N. Kikugawa, J. Ye, *Chem. Eur. J.*, 2009, 15, 3538-3545; M. Dion, M. Ganne, M. Tournoux, gMat. Res. Bull, 1981, 16, 1429-1435; J. Yoshimura, Y. Ebina, J. Kondo, K. Domen, A. Tanaka, *J. Phys. Chem.*, 1993, 97, 1970-1973; J. H. Wu, Y. H. Cheng, J. M. Lin, Y. F. Huang, M. L. Huang, S. C. Hao, *J. Phys. Chem. C*, 2007, 111, 3624-3628).

In 1981, Dion reported a family of layered perovskite type niobates, generally formulated as $AM_2Nb_3O_{10}$ (A=K, Rb, Cs; M=La, Ca, etc.), which show noticeable photocatalytic activity (M. Dion, M. Ganne, M. Tournoux, *Mat. Res. Bull*, 1981, 16, 1429-1435). Soon after that, Yoshimura reported a layered perovskite type niobate, $RbPb_2Nb_3O_{10}$, that could photocatalytically generate $H_2$ from water by visible light (J. Yoshimura, Y. Ebina, J. Kondo, K. Domen, A. Tanaka, *J. Phys. Chem.*, 1993, 97, 1970-1973). Recently, Wu reported $K_{2-x}La_2Ti_{3-x}Nb_xO_{10}$ and their protonated derivatives for water splitting under visible light (J. H. Wu, Y. H. Cheng, J. M. Lin, Y. F. Huang, M. L. Huang, S. C. Hao, *J. Phys. Chem. C*, 2007, 111, 3624-3628). However, the use of layered perovskite type niobates as photocatalysts for the degradation of organic pollutant has received little attention until very recently, when Ye reported efficient photodegradation of Rhodamine B in water using nitrogen-doped lamellar niobic acid X. Li, N. Kikugawa, J. Ye, *Chem. Eur. J.*, 2009, 15, 3538-3545). Although these layered perovskite type niobates and their protonated derivatives show high photoactivity under visible light irradiation, the structures of these photocatalysts are generally not very stable and are susceptible to collapse even under atmospheric conditions.

We are interested in the use of non-layered niobate salts as photocatalysts as we anticipate that they would be more robust than the layered niobates and their protonated derivatives. $K_2Nb_4O_{11}$ is constructed from $NbO_6$ octahedra and has a tetragonal tungsten bronze (TB) crystal structure with triangle, quadrilateral and pentagonal tunnels. The pentagonal and quadrilateral tunnels are occupied by K cations and the triangle tunnels by Nb cations (M. Lundberg, M. Sundberg, *J. Solid State Chem.*, 1986, 63, 216-230). It has been reported that Cu-doping of $K_2Nb_4O_{11}$ results in increased photocatalytic activity for the degradation of acid red G under UV irradiation (G. K. Zhang, X. Zou, J. Gong, F. He, H. Zhang, S. Ouvang, H. Liu, *J. Molec. Catal. A: Chem.*, 2006, 255, 109-116).

SUMMARY OF THE INVENTION

The present invention provides a nitrogen doped photocatalyst which is denoted as $A_2Nb_4O_{11}$—N, or represented by the following general formula (I)

$$A_2Nb_4O_{11-x}N_x \qquad (I)$$

wherein

A is selected from the elements of Group IA of the periodic table; and $0<x<1$

According to one aspect of the present invention, A in the general formula (I) is Li, Na, K, Rb or Cs. Most preferably, A is K.

According to one aspect of the present invention, the compound of the general formula (I) of the present invention has a tetragonal tungsten bronze crystal structure.

According to one aspect of the present invention, the compound of the general formula (I) of the present invention may be used as a photocatalyst. Preferably, said photocatalyst can be activated under visible lights.

The present invention further provides a process for the preparation of the compound of the general formula (I) of the present invention, comprising the steps of:

1) surface acidification of $A_2Nb_4O_{11}$, wherein $A_2Nb_4O_{11}$ is immerged in an acidic solution, filtered, washed and dried; and 2) nitrogen doping of $A_2Nb_4O_{11}$ to obtain $A_2Nb_4O_{11-x}N_x$, wherein $A_2Nb_4O_{11}$ obtained in step 1) is mixed with a nitrogen source and heated, the product is washed to remove residue nitrogen source adsorbed on the surface of the product and dried.

The $A_2Nb_4O_{11-x}N_x$ catalyst of the present invention is prepared by replacing some of the O elements in pure $A_2Nb_4O_{11}$ with N elements, and a process for the preparation thereof comprises a step of doping of nitrogen with a nitrogen source through a solid state reaction.

According to one aspect of the present invention, the nitrogen source in the above process may be an ammonium salt or a nitrogen-containing organic compound, such as ammonium carbonate or urea.

According to one aspect of the present invention, the acidic solution used in step 1) of the above process may be selected from the group consisting of hydrochloric acid, nitric acid, sulfuric acid, or phosphoric acid. Preferably, the acidic solution has a concentration of 1-10 mol/L.

According to one aspect of the present invention, in step 1), the ratio of the weight of $A_2Nb_4O_{11}$ to the volume of the acidic solution may be from 1 g:10 ml to 1 g:600 ml.

According to one aspect of the present invention, in step 1), the duration of the immersing may be 10-96 hours.

According to one aspect of the present invention, in step 1), the washing may be performed with distilled water; the drying may be performed under a temperature of 20-300° C., and the duration of the drying may be above 10 hours.

According to one aspect of the present invention, in step 2), the weight ratio of $A_2Nb_4O_{11}$ and the nitrogen source may be from 1:0.5 to 1:1.0.

According to one aspect of the present invention, in step 2), the heating may be performed under a temperature of 300-600° C.

According to one aspect of the present invention, in step 2), the duration of the heating may be 1-10 hours.

According to one aspect of the present invention, in step 2), the product may be washed with acetone and/or distilled water to remove residue nitrogen source, such as alkaline species, adsorbed on the surface of the product.

According to one aspect of the present invention, in step 2), the drying may be performed under a temperature of 20-300° C., and the duration of the drying may be 10-96 hours.

$A_2Nb_4O_{11}$ used in step 1) of the present invention has a tetragonal tungsten bronze crystal structure. It may be obtained commercially, or may be prepared according to a process known in the art, or may be prepared according a process wherein $A_2Nb_4O_{11}$ is prepared by heating a mixture of $Nb_2O_5$ and $A_2CO_3$ for several hours. In said process, the heating may be performed under a temperature of 800-1200° C.; the duration of the heating may be 8-50 hours; and the ratio of $Nb_2O_5$ and $A_2CO_3$ may be from 3:1 to 1:10.

The present invention further provides a method for degradation of organic pollutants, comprising contacting the organic pollutants with the compound of the general formula (I) of the present invention. As used herein, the term "organic pollutants" generally refers to organic substances which may cause adverse effects to human health and the environment. Preferably, the organic pollutants are those difficult to decompose in waste water. As used herein, the organic pollutants difficult to decompose are organic compounds which may be present in waste water for a long time without decomposition under ambient conditions, such as Orange G (OG) and bisphenol A (BPA).

It has been proven that the new catalyst having a general formula $A_2Nb_4O_{11-x}N_x$ has a narrower optical bandgap compared to pure $A_2Nb_4O_{11}$, and therefore can be activated under the visible light range and it shows high efficiency in the degradation of organic pollutants, especially organic pollutants difficult to decompose. In addition, the process for the synthesis of the nitrogen doped $A_2Nb_4O_{11}$ is simple and can be performed on a large scale, and the process for nitrogen doping is less expensive than conventional sputtering ones. The present photocatalyst has the advantages of non-toxicity, chemical inertness, high stability under light irradiation, and high photo efficiency under visible light, and is therefore a superior photocatalyst.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure will become more fully understood from the detailed description given herein below for illustration only, and thus are not limitative of the present disclosure, and wherein.

DETAILED DESCRIPTION OF THE INVENTION

Figure 1:
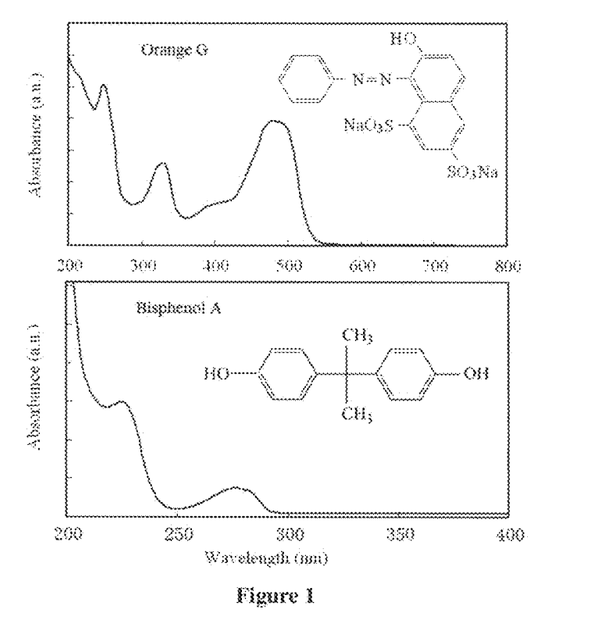
FIG. 1. Molecular structures of OG and BPA and their UV-Vis absorption spectrum.

The present invention provides more effective photocatalysis with sunlight by nitrogen doped $A_2Nb_4O_{11}$. Specifically, the efficiency of $K_2Nb_4O_{11}$—N for the photodegradation of organic pollutants under visible light (>399 nm) irradiation has been investigated by using Orange G (OG) and bisphenol A (BPA) as substrates. Orange G (OG), a synthetic azo dye with formula $C_{16}H_{10}N_2Na_2O_7S_2$ (7-hydroxy-8-phenylyazo-1,3-naphthalenedisulfonic acid disodium salt), is an endocrine disruptor (B. Muktha, G. Madras, T. N. G. Row, U. Scherf, S. Patil, Conjugated polymers for photocatalysis *J. Phys. Chem. B*, 2007, 111, 7994-7998; P. Mahata, G. Madras, S. Natarajan, *Catal. Lett.*, 2007, 115, 27-32; P. Mahata, G. Madras, S, Natarajan, *J. Phys. Chem.* B, 2006, 110, 13759-13768; S. Mahapatra, G. Madras, T. N. Guru Row, *J. Phys. Chem.* C, 2007, 111, 6505-6511; M. Sokmen, A. O zkan, *J. Photochem. Photobiol. A—Chem.*, 2002, 147, 77-81; C. Guillard, H. Lachheb, A. Houas, M. Ksibi, E. Elaloui, J.-M. Herrmann, *J. Photochem. Photobiol. A—Chem.*, 2003, 158, 27-36; J. Sun, X. Wang, J. Sun, R. Sun, S. Sun, L. Qiao, *J. Mol. Catal. A—Chem.*, 2006, 260, 241-246; J. M. Kwon, Y. H. Kim, B. K. Song, S. H. Yeom, B. S. Kim, J. B. Im, *J. Hazard. Mater.*, 2006, 134, 230-236; G. Sivalingam, K. Nagaveni, M. S. Hegde, G. Madras, *Appl. Catal. B—Environ.*, 2003, 45, 23-38; C. Hachem, F. Bocquillon, O. Zahraa, M. Bouchy, *Dyes Pigment.*, 2001, 49, 117-125; S. Yang, L. Lou, K. Wang, Y. Chen, *Appl. Catal. A—Gen.*, 2006, 301, 152-157; K. Nagaveni, G. Sivalingam, M. S. Hegde, G. Madras, *Appl. Catal. B—Environ.*, 2004, 48, 83-93; J. H. Sun, L. P. Qiao, S. P. Sun, G. L. Wang, *Journal of Hazard. Mater.*, 2008, 155, 312-319). It is a common reagent in molecular biology and is used in histology as a staining agent. Bisphenol A is also a known endocrine disruptor which has been widely used for the production of polycarbonate (PC) and epoxy resins used in food containers R. Tsekov, E. Evstatieva, K. W. Stockelhuber, P. G. Smirniotis, *Progr Colloid Polym Sci.*, 2004, 126, 117-120; D. Beydoun, R. Amal, G. K.-C. Low, S. McEvoy, *J. Phys. Chem. B*, 2000, 104, 4387-4396; G. K. Zhang, X. Zou, J. Gong, F. He, H. Zhang, S. Ouyang, H. Liu, *J. Molec. Catal. A: Chem.*, 2006, 255, 109-116; B. Muktha, G. Madras, T. N. G. Row, U. Scherf, S. Patil, Conjugated polymers for photocatalysis, *J. Phys. Chem. B*, 2007, 111, 7994-7998; P. Mahata, G. Madras, S, Natarajan, *Catal. Lett.*, 2007, 115, 27-32). Its concentration in wastewaters is increasing, which has become a worldwide pollution problem. The molecular structures and the UV-Vis absorption spectra of OG and BPA are shown in FIG. 1. OG absorbs strongly in the visible region but BPA absorbs only in the UV region. The results of the photodegradation experiments of the present invention show that the $K_2Nb_4O_{11}$—N photocatalyst has a much higher visible light activity than pure $K_2Nb_4O_{11}$ or $Nb_2O_5$, and it is also more active than Degussa P25 $TiO_2$. These results indicate that the photoactivity of $K_2Nb_4O_{11}$ has been profoundly increased by nitrogen doping.

In order to prepare the nitrogen doped photocatalyst having the general formula $A_2Nb_4O_{11-x}N_x$ to fulfill the object of the present invention, the process for the preparation thereof are exemplarily described with examples.

As the present invention may be embodied in several forms without departing from the spirit thereof, it should be understood that the embodiments of the present invention are not limited by any of the details of the description. Unless otherwise specified, it should be construed that all changes and modification of the embodiments of the present invention are within the scope as defined in the appended claims. Meanwhile, all the references cited in the present application are incorporated herein by reference in their entirety.

PREPARATION EXAMPLES

Example 1 a) $K_2Nb_4O_{11}$ was prepared by heating a mixture of 0.2 g $Nb_2O_5$ and 0.8 g $K_2CO_3$ at 900° C. for 24 hours;
b) 1.0 g $K_2Nb_4O_{11}$ was immersed in 60 mL of 5 mol/L nitric acid solution for 48 hours, and then the product was filtered, washed with distilled water, and dried at 100° C. for 20 hours;
c) 10.0 g urea and 1.0 g $K_2Nb_4O_{11}$ were mixed and finely milled, and heated at 600° C. for 3 hours to provide a yellow product, which was washed with acetone to remove any residual alkaline species adsorbed on the surface of the product, and dried at 100° C. for 24 hours.

Example 2 a) $K_2Nb_4O_{11}$ was prepared by heating a mixture of 0.2 g $K_2CO_3$ and 0.8 g $Nb_2O_5$ at 900° C. for 24 hours;
b) 1.0 g $K_2Nb_4O_{11}$ was immersed in 60 mL of 5 mol/L nitric acid solution for 48 hours, and then the product was filtered, washed with distilled water, and dried at 100° C. for 20 hours;
c) 10.0 g $K_2Nb_4O_{11}$ and 2.0 g urea were finely milled, and heated at 400° C. for 4 hours. The resulted yellow product was washed with acetone and distilled water, and dried at 70° C. for 24 hours.

Example 3 a) $K_2Nb_4O_{11}$ was prepared by heating a mixture of 0.2 g $K_2CO_3$ and 0.8 g $Nb_2O_5$ at 1100° C. for 10 hours;
b) 1.0 g $K_2Nb_4O_{11}$ was emerged immersed in 300 mL of 3 mol/L hydrochloric acid solution for 48 hours, and then the product was filtered, washed with distilled water, and dried at 100° C. for 20 hours;
c) 1.0 g $K_2Nb_4O_{11}$ and 10.0 g ammonium bicarbonate were finely milled, and heated at 400° C. for 4 hours. The resulted yellow product was washed with acetone and distilled water, and dried, at 70° C. for 24 hours.

Example 4 a) $Na_2Nb_4O_{11}$ was prepared by heating a mixture of 0.2 g $Na_2CO_3$ and 0.8 g $Nb_2O_5$ at 900° C. for 24 hours;
b) 1.0 g $Na_2Nb_4O_{11}$ was immersed in 3060 mL of 3 mol/L nitric acid solution for 96 hours, and then the product was filtered, washed with distilled water, and dried at 300° C. for 10 hours;
c) 1.0 g $Na_2Nb_4O_{11}$ and 0.5 g urea were finely milled, and heated at 400° C. for 24 hours. The resulted yellow product was washed with acetone, and dried at 100° C. for 24 hours.

Example 5 a) $Na_2Nb_4O_{11}$ was prepared by heating a mixture of 0.2 g $Na_2CO_3$ and 0.8 g $Nb_2O_5$ at 1100° C. for 24 hours;
b) 1.0 g $Na_2Nb_4O_{11}$ was immersed in 60 mL of 5 mol/L nitric acid solution for 48 hours, and then the product was filtered, washed with distilled water, and dried at 100° C. for 24 hours;
c) 1.0 g $Na_2Nb_4O_{11}$ and 10.0 g urea were finely milled, and heated at 400° C., for 6 hours. The resulted yellow product washed with acetone, and dried at 100° C. for 24 hours.

Example 6 a) $Na_2Nb_4O_{11}$ was prepared by heating a mixture of 0.2 g $Nb_2O_5$ and 0.8 g $Na_2CO_3$ at 900° C. for 24 hours;
b) 1.0 g $Na_2Nb_4O_{ii}$ was immersed in 60 mL of 5 mol/L nitric acid solution for 48 hours, and then the product was filtered, washed with distilled water, and dried at 100° C. for 20 hours;
c) 10.0 g urea and 1.0 g $Na_2Nb_4O_{11}$ were mixed and finely milled, and heated at 400° C. for 24 hours to provide a yellow product, which was washed with acetone to remove any residues adsorbed on the surface of the product, and dried at 100° C. for 24 hours.

TEST EXAMPLES

The nitrogen doped. $K_2Nb_4O_{11}$ used in the test Examples is $K_2Nb_4O_{11}$—N prepared in Example 2.

1. Characterization of the Compound Having the General Formula (I)

The instruments for characterization include: powder X-ray diffraction (XRD), scanning electron microscopy (SEM), X-ray photoelectron spectroscopy (XPS), UV/Vis diffuse reflectance and photoluminescence spectroscopy (PL). The XRD analysis was performed on a Rigaku D-max X-ray diffractometer with Cu $K_\alpha$ irradiation ($\lambda=1.5406$ Å) at a scanning speed of 0.025°/sec over the scanning range of 20-70°. The morphologies were examined by a Philips XL30 environmental scanning electron microscope (ESEM) at an accelerating voltage of 10 kV. The surface analysis was done with a Leybold Heraeus-Shengyang SKL-12 electron spectrometer equipped with a VG CLAM 4 MCD electron energy analyzer, with Al—$K\alpha$ as the excitation source. UV-Vis diffuse reflectance was performed on a Perkin Elmer Lambda 750 UV-Vis Spectrophotometer. Photoluminescence (PL) spectra were measured using a FluoroMax-3 spectrofluorimeter equipped with a pulsed xenon lamp as light source.

2. Photo-Catalytic Degradation Measurements

A 200 W xenon arc lamp (Newport, Model 71232) was used as the light source. OG or BPA aqueous solution (30 ml, 20 mg/L) and the photocatalyst (~10 mg, nitrogen doped $K_2Nb_4O_{11}$ prepared in Example 2) were placed into a quartz tube reactor (12 mm in diameter and 200 mm in length) and the mixture was sonicated for 5 minutes to disperse the catalyst in the OG or BPA aqueous solution. The distance between the liquid surface and the light source was about 11 cm. Before the photoirradiation, the mixture was stirred in the dark for one hour so as to establish adsorption-desorption equilibrium on the surface of the catalyst for OG or BPA. The Infrared and UV light emitted from the Xe-lamp was filtered by a water jacket and a cutoff filter (Scott AG KV 399). Samples were collected at regular time intervals and centrifuged before Analysis. The concentrations of OG or BPA were measured with a Shimadzu UV-1700 UV-Vis spectrophotometer, wherein the OG or BPA concentration is proportional to its absorbance.

3. Results and Discussion

3.1 XRD

Figure 2:
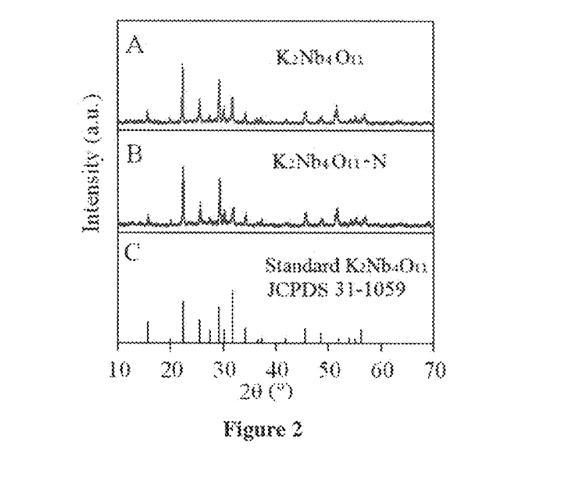
FIG. 2. XRD patterns of: A) $K_2Nb_4O_{11}$ B) $K_2Nb_4O_{11}$—N and C) standard $K_2Nb_4O_{11}$ (JCPDS 31-1059).

Powder X-ray diffraction (XRD) shows nearly identical patterns for $K_2Nb_4O_{11}$ and $K_2Nb_4O_{11}$—N prepared in Example 2. Typical XRD patterns of $K_2Nb_4O_{11}$ and $K_2Nb_4O_{11}$—N are shown in FIGS. 2A and 2B, respectively. For $K_2Nb_4O_{11}$ (FIG. 2A), all the diffraction peaks can be indexed as a tetragonal tungsten bronze structure (JCPDS 31-1059) with lattice constants of a=0.126 nm and c=0.398 nm. The XRD pattern of nitrogen doped $K_2Nb_4O_{11}$ nearly identical to that of undoped sample, as shown in FIG. 2B, indicating that there is no effect of nitrogen doping on the crystal structure of $K_2Nb_4O_{11}$, which suggests that (loping occurs only on the surface.

3.2 SEM

Figure 3:
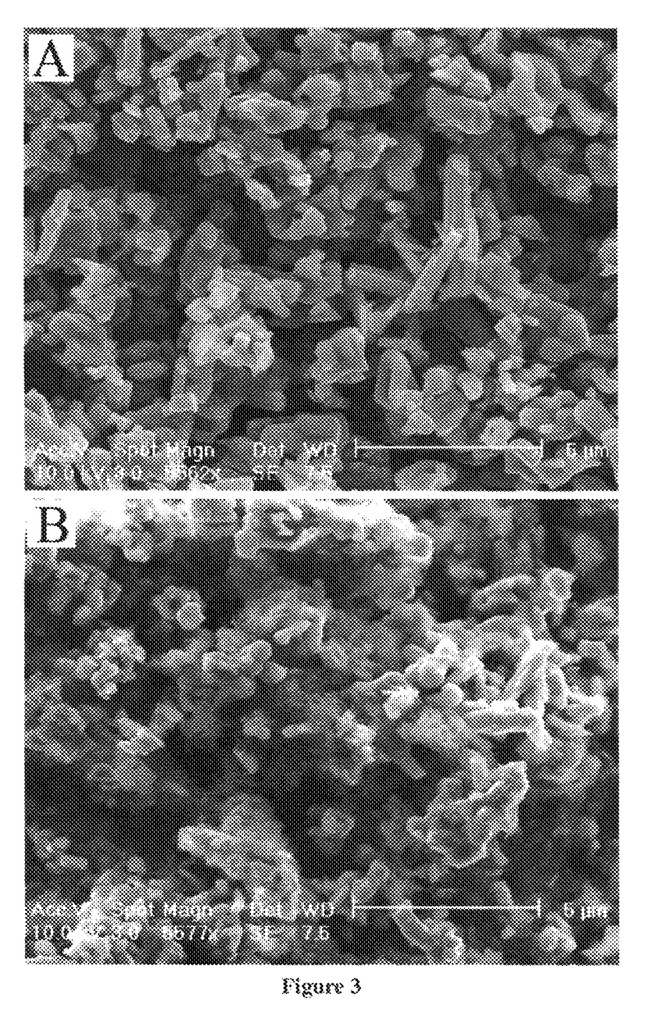
FIG. 3. SEM images of: A) $K_2Nb_4O_{11}$ and B) $K_2Nb_4O_{11}$—N.

The SEM photographs of $K_2Nb_4O_{11}$ and $K_2Nb_4O_{11}$—N are shown in FIGS. 3A and 3B, respectively. FIG. 3A shows that the sizes and shapes of particles are inhomogeneous and the surface is clean. However, when $K_2Nb_4O_{11}$ was heated together with urea at 400° C., the surface of the sample became flock-like, but the sizes and shapes of the particles were not significantly changed. The SEM and XRD results together indicate that nitrogen doping does not affect the morphology and crystal structure of $K_2Nb_4O_{11}$, but affects the surface profile of the sample, as nitrogen doping occurs mainly on the surface of the sample,

3.3 XPS

Figure 4:
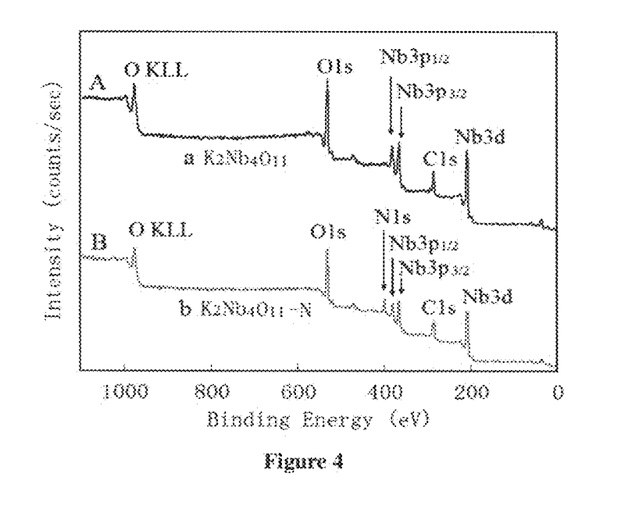
FIG. 4. XPS spectra in the whole energy range. A) $K_2Nb_4O_{11}$ and B) $K_2Nb_4O_{11}$—N.

The X-ray photoelectron spectroscopy (XPS) analysis is an important method to determine the composition and the chemical state of the elements. The XPS spectra of $K_2Nb_4O_{11}$ and $K_2Nb_4O_{11}$—N in wide energy range are shown in FIG. 4. No significant contamination, besides carbon, is found in the spectra. The binding energy was determined by reference to C 1s line at 284.8 eV. In the whole energy range spectrum shown in FIG. 4, the elements K, Nb and O can be observed in $K_2Nb_4O_{11}$ and $K_2Nb_4O_{11}$—N. However, N can only be seen in $K_2Nb_4O_{11}$—N, indicating successful doping of N onto the surface of $K_2Nb_4O_{11}$. The N concentration is calculated to be 3.9 atom % using the equation, $$C_N = \frac{\frac{I_N}{S_N}}{\sum_i \frac{I_i}{S_i}}$$

Where $C_N$ is the nitrogen concentration, $I_N$ and $I_i$ are the peak intensities of nitrogen and other elements, respectively; $S_N$ and $S_i$ are the relative sensitivity factors of nitrogen and other elements, respectively.

Figure 5:
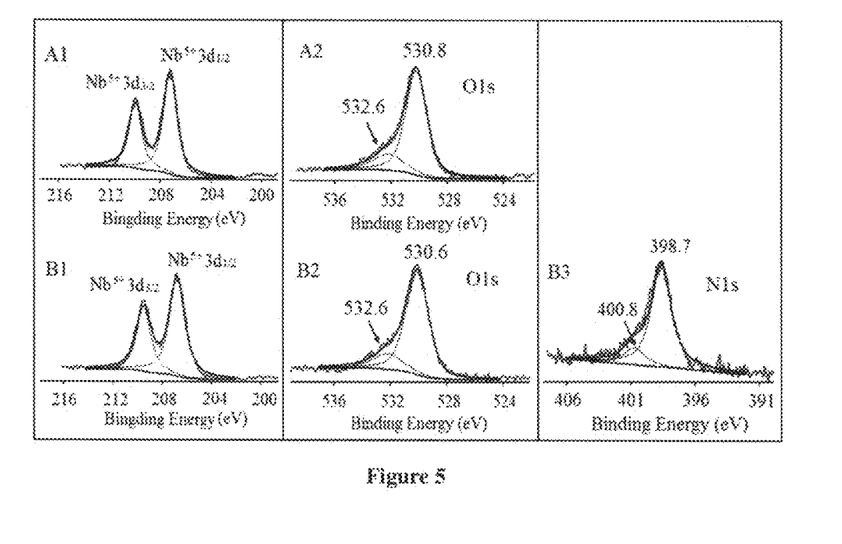
FIG. 5. XPS spectra of the elements in $K_2Nb_4O_{11}$ (A) and $K_2Nb_4O_{11}$—N (B). 1, 2 and 3 refer to Nb, O and N, respectively.

To further determine the chemical states of the elements Nb, O and N, core level XPS spectra of $K_2Nb_4O_{11}$ and $K_2Nb_4O_{11}$—N are shown in FIG. 5. FIG. 5-A1 and B1 show that the binding energies of Nb $3d_{5/2}$ for $K_2Nb_4O_{11}$ and $K_2Nb_4O_{11}$—N are 206.8 and 206.9 eV, respectively, which are consistent with the reported values (G. K. Zhang, Y. J. Hu, X. M. Ding, J. Zhou, J. W. Xie, *J. Solid State Chem.*, 2008, 181, 2133-2138). The chemical shifts of the binding energies of Nb $3d_{5/2}$ in these two materials are small. However, the full widths at half maximum (FWHM) of the Nb $3d_{5/2}$ peaks are different. The FWHM of Nb $3d_{5/2}$ for $K_2Nb_4O_{11}$ and $K_2Nb_4O_{11}$—N is 1.7 and 1.9 eV, respectively. The broadening of the Nb $3d_{5/2}$ peak indicates that the electron density on the Nb atoms in $K_2Nb_4O_{11}$—N is higher than that in $K_2Nb_4O_{11}$ (T. Shishido, M. Oku, S. Okada, K. Kudou, J. Ye, T. Sasaki, Y. Watanabe, N. Toyota, H. Horiuchi, T. Fukuda, *J. Alloy. Comp.*, 1998, 281, 196-201). The main O 1s peak at 530.8 and 530.6 eV in FIGS. 5 A2 and B2 are assigned to lattice oxygen of $K_2Nb_4O_{11}$ and $K_2Nb_4O_{11}$—N, respectively (A. Molak, E. Talik, M. Kruczek, M. Paluch, A. Ratuszna, Z. Ujma, *Mater. Sci. and Engo. B*, 2006, 128, 16-24; S.-Y. Lai, Y. Qiu, S. Wang, *J. Catal.*, 2006, 237, 303-313). A higher binding energy shoulder is found for both samples at about 532.6 eV, this is assigned to a mixture of surface hydroxyl and carbonate groups. Nitrogen is found only on $K_2Nb_4O_{11}$—N and the core-level N1s XPS is shown in FIG. 5-B3. The N1s spectrum is divided into two components with peak energies of 398.7 and 400.8 eV, respectively, which are assigned to be $(N)_i/(NO)_O$ and $(NO)_i/(NO_2)_O$, respectively R. Asahi, T. Morikawa, *Chem. Phys.*, 2007, 339, 57-63). $(N)_i$ represents N in the interstitial space, $(NO)_O$ denotes NO sitting at the site for the lattice O. Similarly, (NO)$_i$ and (NO$_2$)$_O$ designate the interstitial NO and substitutional NO$_2$ for the lattice O, respectively.

3.4 UV-Vis Diffuse Reflectance

Figure 6:
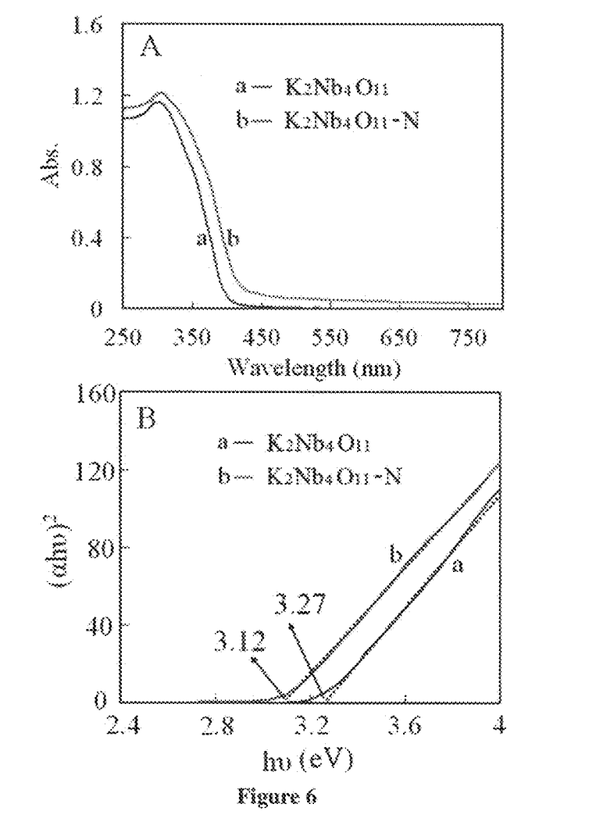
FIG. 6. A) UV-vis diffuse reflectance spectra of $K_2Nb_4O_{11}$ and $K_2Nb_4O_{11}$—N; B) The curve deduced from A according to the equation $(ahv)^2=A(hv-E_g)$.

The light absorption of the samples can be measured with UV/Vis diffuse reflectance spectroscopy (M. A. Butler, *J. Appl. Phys.,* 1997, 48, 1914-1920). FIG. 6 shows the UV/Vis diffuse reflectance spectra of K$_2$Nb$_4$O$_{11}$ and K$_2$Nb$_4$O$_{11}$—N. It is known that the optical absorption coefficient near the band edge follows the equation (ahv)$^2$=A(hv-E$_g$), wherein a, h, v, E$_g$ and A are the absorption coefficient, Planck constant, light frequency, band gap, and a constant, respectively. From this equation, the band gaps can be calculated to be 3.27 eV and 3.12 eV for K$_2$Nb$_4$O$_{11}$ and K$_2$Nb$_4$O$_{11}$—N, respectively. The red-shift of the absorption wavelength of K$_2$Nb$_4$O$_{11}$—N compared with that of K$_2$Nb$_4$O$_{11}$, indicating that nitrogen-doping has a narrowing effect on the band gap of the material.

3.5 Photoluminescence (PL)

Figure 7:
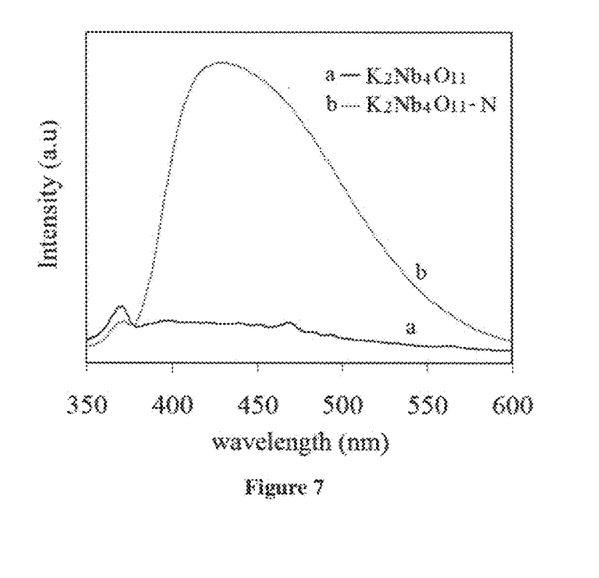
FIG. 7. Photoluminescence (Ph) emission spectra of (a) $K_2Nb_4O_{11}$ and (b) $K_2Nb_4O_{11}$—N.

Photoluminescence emission spectra of semiconductors are related to the transport/relaxation behavior of the photo-induced electrons and holes, and thus can be used to determine band gaps, and to detect impurities and defects (Y. C. Zhu, C. X. Ding, *J. Solid State Chem.,* 1999, 145, 711-715). In order to study the effect of nitrogen doping on the band gap of K$_2$Nb$_4$O$_{11}$, PL spectra are shown in FIG. 7. There is a peak at about 370 nm for both K$_2$Nb$_4$O$_{11}$ and K$_2$Nb$_4$O$_{11}$—N, which is due to the band gap of K$_2$Nb$_4$O$_{11}$ crystals. On the other hand, K$_2$Nb$_4$O$_{11}$—N has an additional broad emission peak from 380 to 600 nm (C. Yu, J. C. Yu, *Catal. Lett.,* 2009, 129, 462-470; Y. Qiu, S. Yang, *Advanced Functional Materials,* 2007, 17, 1345-1352; J. C. Yu, J. G. Yu, W. K. Ho, Z. T. Jiang, L. Z. Zhang, *Chem. Mater.,* 2002, 14, 3808-3816), which confirms the effect of nitrogen doping on narrowing the band gap of K$_2$Nb$_4$O$_{11}$—N.

3.6 Photocatalytic Degradation of Orange G by UV and Visible Light

Figure 8:
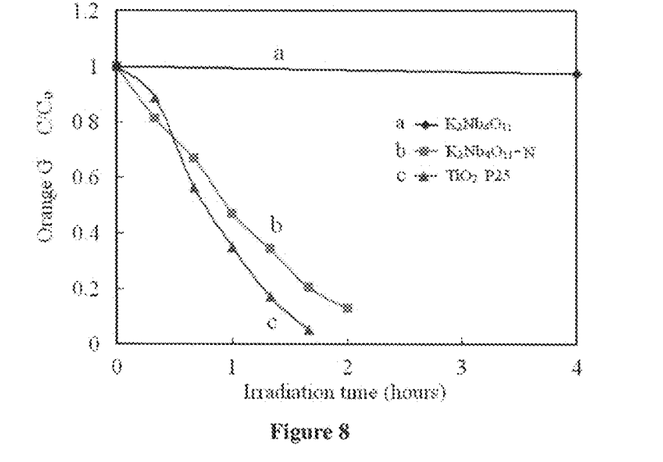
FIG. 8. Plot of $C/C_o$ ($C$ is the concentration at time t, $C_o$ is the initial concentration) versus time for the photo-degradation of OG using 330 nm cut off filter with a) $K_2Nb_4O_{11}$, b) $K_2Nb_4O_{11}$—N and c) $TiO_2$ P25.
Figure 9:
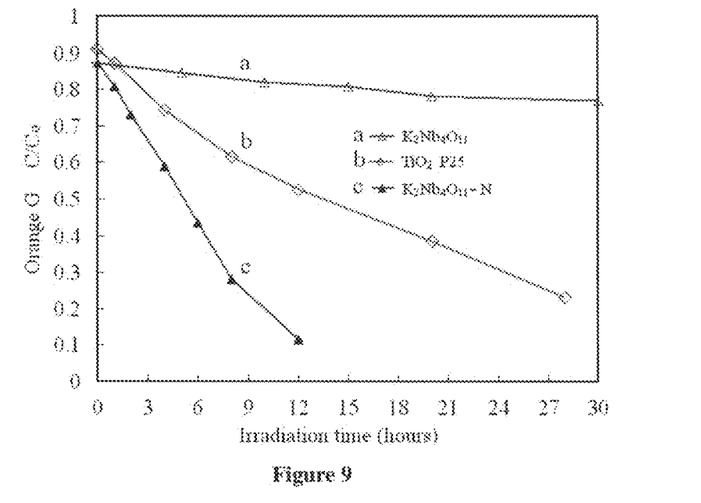
FIG. 9. Plot of $C/C_o$ ($C$ is the concentration at time t, $C_o$ is the initial concentration) versus time for photo-degradation of OG using 399 nm cut off filter with a) $K_2Nb_4O_{11}$, b) $TiO_2$ P25 and c) $K_2Nb_4O_{11}$—N.

The results of the photo-degradation of OG using K$_2$Nb$_4$O$_{11}$ and K$_2$Nb$_4$O$_{11}$—N as photocatalysts are shown in FIG. 8. The degradation of OG was negligible after 4 h when K$_2$Nb$_4$O$_{11}$ was used as the photocatalyst. On the other hand, when K$_2$Nb$_4$O$_{11}$—N was used, nearly 90% OG was degraded after 2 h of irradiation, indicating that nitrogen doping greatly enhances the photocatalytic activity of the K$_2$Nb$_4$O$_{11}$. Control experiments show that both light and the photocatalyst are required for the degradation of OG. The degradation of OG by K$_2$Nb$_4$O$_{11}$—N is only slightly less efficient than TiO$_2$ P25 when 330 nm cutoff filter is used. On the other hand, when 399 nm cutoff filter is used, the photocatalytic activity of K$_2$Nb$_4$O$_{11}$—N is much higher than that of TiO$_2$ P25. As shown in FIG. 9, nearly 90% of OG is degraded over the K$_2$Nb$_4$O$_{11}$—N after 12 h of photoirradiation when a 399 nm cutoff filter is used, while only 46% is degraded over TiO$_2$ P25.

Figure 10:
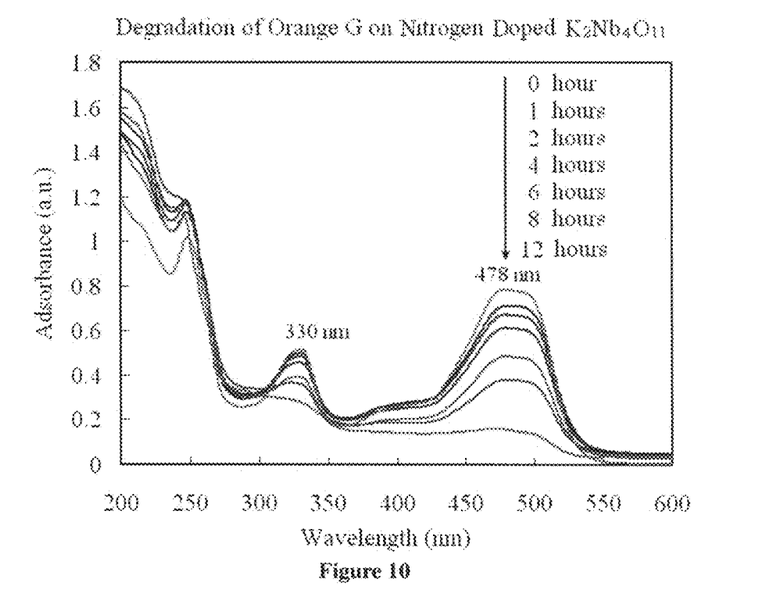
FIG. 10. Spectral changes of OG during irradiation using 399 nm cutoff filter with $K_2Nb_4O_{11}$—N.
Figure 11:
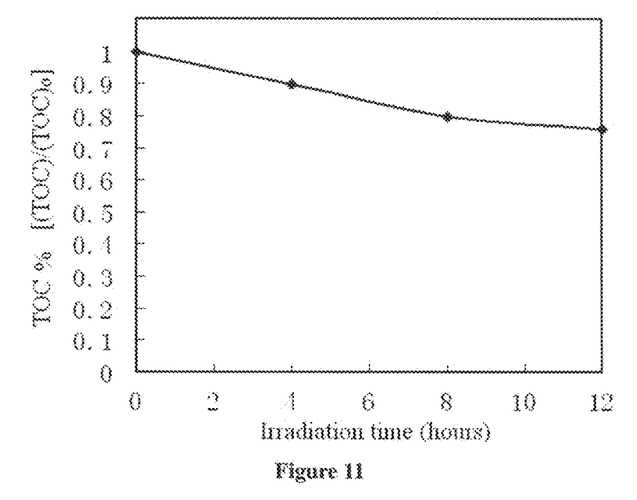
FIG. 11. Plot of $(TOC)/(TOC)_o$ [(TOC) is the total organic carbon at time t, $(TOC)_o$ is the initial total organic carbon] versus time for photo-degradation of OG using a 399 nm cut off filter with $K_2Nb_4O_{11}$—N.

FIG. 10 shows the spectral changes of OG during irradiation using 399 nm cutoff filter with K$_2$Nb$_4$O$_{11}$—N. The main absorption band of OG is at around 478 nm, which decreases with time upon irradiation, but the $\lambda_{max}$ does not change, indicating that the photodegradation does not occur by a dye self-photosensitized oxidative mechanism (T. Wu, G. Liu, J. Zhao, H. Hidaka, N. Serpone, *J. Phys. Chem. B,* 1998, 102, 5845-5851). Apart from the peak at 478 nm, the photodegradation of OG by K$_2$Nb$_4$O$_{11}$—N also results in the disappearance of the peak at 330 nm, indicating that both the OG chromophores and the aromatic rings have been destroyed (X. Li, N. Kikugawa, J. Ye, *Chem. Eur. J.,* 2009, 15, 3538-3545). Also the total organic carbon (TOC) value of the solution decreases by approximately 25% at 90% OG conversion after 12 h of irradiation (see FIG. 11), indicating that OG is mainly degraded to aliphatic organic compounds and is only partially mineralized to CO$_2$ and/or CO.

Figure 12:
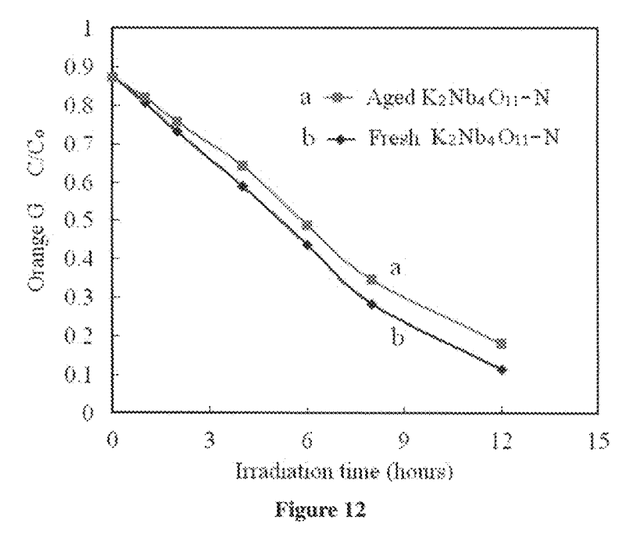
FIG. 12. Plot of $C/C_o$ ($C$ is the concentration at time t, $C_o$ is the initial concentration) versus time for photo-degradation of OG using a 399 nm cut off filter with a) Aged $K_2Nb_4O_{11}$—N; b) Fresh $K_2Nb_4O_{11}$—N.

To assess the stability of the photocatalyst, a sample of K$_2$Nb$_4$O$_{11}$—N was aged under ambient conditions for six months and its photocatalytic activity was then tested. As shown in FIG. 12, the photocatalytic activity of the aged K$_2$Nb$_4$O$_{11}$—N sample decreases by only about 6% compared with the freshly prepared sample, indicating that K$_2$Nb$_4$O$_{11}$—N photocatalyst is reasonably stable when stored under ambient conditions.

3.7 Photocatalytic Degradation of BPA by Visible Light

Figure 13:
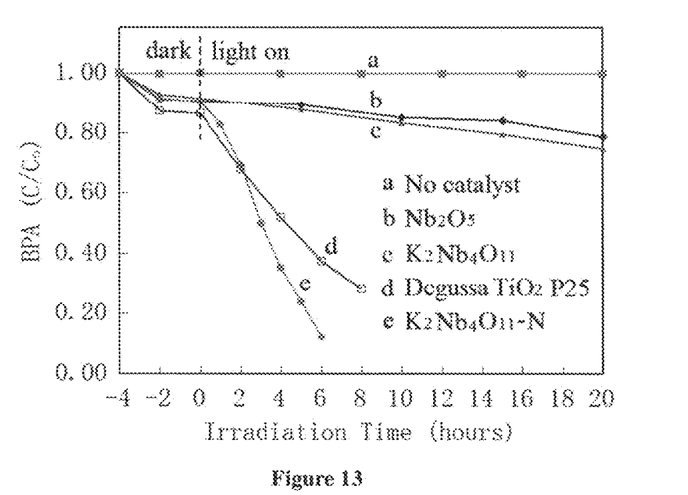
FIG. 13. Plot of $C/C_o$ ($C$ is the concentration at time t, $C_o$ is the initial concentration) versus time for photo-degradation of BPA using a 399 nm cutoff filter with a) no catalyst; b) $Nb_2O_5$; c) $K_2Nb_4O_{11}$; d) Degussa $TiO_2$ P25; e) $K_2Nb_4O_{11}$—N.

It has been suggested by several authors that the photocatalytic degradation of dyes under visible light may be induced by self-photosensitization of the dye rather than by the catalyst (M. R. Hoffmann, S. T. Martin, W. Y. Choi, D. W. Bahnemann, *Chem. Rev.,* 1995, 95, 69-96; A. Mills, J. S. Wang, *J. Photochem. Photobiol. A.,* 1999, 127, 123-134; M. Mrowetz, W. Balcerski, A. J. Colussi, M. R. Hoffmann, *J. Phys. Chem. B.,* 2004, 108, 17269-17273; X. L. Yan, T. Ohno, K. Nishijima, R. Abe, B. Ohtani, *Chem. Phys. Lett.,* 2006, 429, 606-610; B. Ohtani, *Chem. Lett.,* 2008, 37, 217-229; G. S. Wu, T. Nishikawa, B. Ohtani, A. C. Chen, *Chem. Mater.,* 2007, 19, 4530-4537; R. Abe, H. Takami, N. Murakami, B. Ohtani, *J. Am. Chem. Soc.,* 2008, 130, 7780-7781; F. Amano, O.-O. Prieto-Mahaney, Y. Terada, T. Yasumoto, T. Shibayama, B. Ohtani, *Chem. Mater.,* 2009, 21, 2601-2603; F. Amano, A. Yamakata, K. Nogami, M. Osawa, B. Ohtani, *J. Am. Chem. Soc.,* 2008, 130, 17650-17651). In order to understand the photoactivity of K$_2$Nb$_4$O$_{11}$—N under visible light, Bisphenol A (BPA), which is a colorless pollutant, was selected as another probe substrate. For comparison, Nb$_2$O$_5$, pure K$_2$Nb$_4$O$_{11}$ and Degussa TiO$_2$ P25 were also used as photocatalysts and the results are shown in FIG. 13.

In the absence of a photocatalyst, the concentration of BPA remained virtually unchanged even after 20 h of visible light irradiation (399 nm cutoff). Also, BPA was not degraded by the photocatalysts in the dark. However, upon visible light irradiation in the presence of K$_2$Nb$_4$O$_{11}$—N, 90% of BPA was degraded after 6 h. This photoactivity is higher than that of Degussa TiO$_2$ P25, and is much higher than that of pure K$_2$Nb$_4$O$_{11}$ and Nb$_2$O$_5$. These results confirm that nitrogen doping greatly enhances the photoactivity of K$_2$Nb$_4$O$_{11}$.

3.8 Mechanism for the Photocatalytic Activity of K$_2$Nb$_4$O$_{11}$—N

Figure 14:
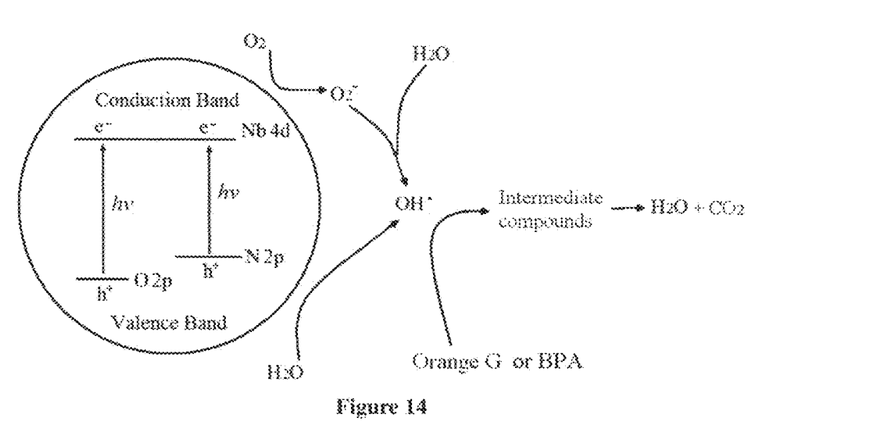
FIG. 14. Scheme of the band structure of $K_2Nb_4O_{11}$—N and visible photocatalytic processes.

Taking K$_2$Nb$_4$O$_{11}$—N as an example, the band structure for the K$_2$Nb$_4$O$_{11}$—N is proposed, as schematically shown in FIG. 14. In the K$_2$Nb$_4$O$_{11}$—N photocatalyst, there exist isolated N 2p states above the valence-band maximum of K$_2$Nb$_4$O$_{11}$, which give rise to the strong absorption enhancement in the visible region. Under visible light irradiation, electron and hole pairs would be generated between impurity N 2p states and the conduction band of Nb 4d (equation 1).

$$K_2Nb_4O_{11}\text{—}N + \text{visible light} \longrightarrow h^+ + e^-_{CB} \qquad (1)$$

The excited electrons $e^-_{cB}$ in the conduction band would move to the surface and combine with surface-adsorbed oxygen to produce $O_2^-$ superoxide anion radicals. The $O_2^-$ radicals could then react with $H_2O$ to produce .OH radicals (equation 2), which are known to be one of the most oxidizing species. On the other hand, the reactive holes h' would react with adsorbed $OH^-$ on the catalyst surface to also form .OH radicals (equations 3-4).

$$O_{2ads}^- + 2H_2O \rightarrow .OH^- + H_2O_2 \quad (2)$$

$$H_2O \rightleftharpoons OH^-_{ads} + H^+ \quad (3)$$

$$OH^-_{ads} + h^+ \rightarrow .OH \quad (4)$$

The .OH radicals would react with OG and BPA to produce $H_2O$ and $CO_2$ via various intermediates.

Figure 15:
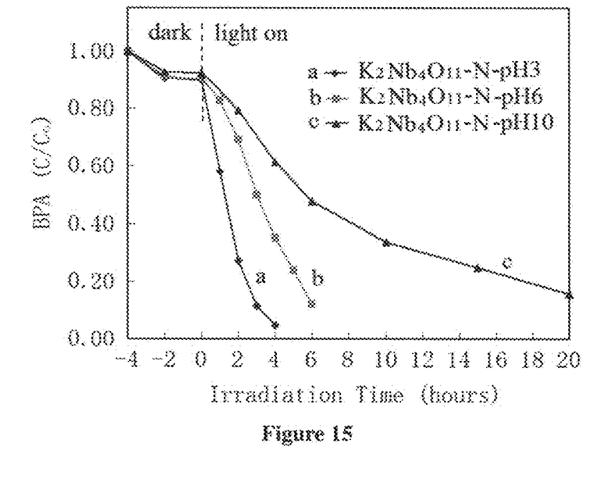
FIG. 15. Plot of $C/C_o$ ($C$ is the concentration at time t, $C_o$ is the initial concentration) versus time for photo-degradation of BPA by $K_2Nb_4O_{11}$—N at different pH; a) pH3; b) pH6; c) pH10.

In order to provide more evidence to support the proposed mechanism, the effects of pH on the photocatalytic degradation of BPA by $K_2Nb_4O_{11}$—N were also studied (see FIG. 15). It was found that photocatalytic activity of $K_2Nb_4O_{11}$—N increases when the solution pH decreases. This may be explained by the processes shown in equations 5-7, which occur in the presence of $H^+$.

$$O_{2ads}^- + H^+ \rightarrow HO_{2ads}^. \quad (5)$$

$$HO_{2ads}^. + H_2O \rightarrow .OH_{ads} + H_2O_{2ads} \quad (6)$$

$$H_2O_{2ads} + e_{CB}^- \rightarrow .OH_{ads} + OH_{ads}^- \quad (7)$$

These processes facilitate trapping of the electrons in the conduction band of $K_2Nb_4O_{11}$—N which produces $.OH_{ads}$. This trapping mechanism retards the recombination of electron-hole pairs and allows a more efficient charge separation. Hence, the transfer of trapped electrons to dissolved oxygen in the solution would be enhanced and more holes and hydroxyl radicals would be available for the oxidation of BPA on the catalyst surface as well as in the solution phase. This pH effect supports our proposed mechanism for the photocatalytic activity of $K_2Nb_4O_{11}$—N under visible light.

4. Conclusions

In the present invention, $A_2Nb_4O_{11}$—N has been prepared, fully characterized and used for the photodegradation of OG and BPA. XRD and SEM show that the crystal structures of $K_2Nb_4O_{11}$—N and $K_2Nb_4O_{11}$ are nearly identical, but the surface profile has been changed significantly due to the nitrogen doping. XPS and PL indicate that the nitrogen doping primarily occurs at the surface of $K_2Nb_4O_{11}$, while UV/Vis diffuse reflectance data further reveal that nitrogen doping narrows the band gap of $K_2Nb_4O_{11}$. The photocatalytic activity of the $K_2Nb_4O_{11}$—N has been evaluated by photodegradation of OG and BPA under visible light irradiation. The results show that the photocatalytic activity of $K_2Nb_4O_{11}$—N is significantly higher than that of pure $K_2Nb_4O_{11}$ and Degussa $TiO_2$ P25 under visible light irradiation, highlighting the importance of nitrogen doping of $K_2Nb_4O_{11}$. Overall, we have for the first time prepared and characterized $A_2Nb_4O_{11}$—N with high photocatalytic activity even with visible light illumination. Moreover, this photocatalyst is very stable (at least six months under ambient conditions), its preparation is simple and highly reproducible, and it is easy to separate from the solution by simple centrifugation.

What is claimed is:

1. A compound, which is a nitrogen doped $A_2Nb_4O_{11}$ represented by the following general formula (I)

$$A_2Nb_4O_{11-x}N_x \quad (I)$$

wherein
A is selected from the elements of Group IA of the periodic table; and $0<x<1$.

2. The compound of claim 1, wherein A is Li, Na, K, Rb or Cs.

3. The compound of claim 1, wherein the compound has a tetragonal tungsten bronze crystal structure.

4. The compound of claim 1, wherein the compound is a photocatalyst.

5. The compound of claim 4, wherein the photocatalyst is activated under visible lights.

6. A process for the preparation of the compound of claim 1, comprising the steps of:
   1) surface acidification of $A_2Nb_4O_{11}$, wherein $A_2Nb_4O_{11}$ is immersed in an acidic solution, filtered, washed and dried; and
   2) nitrogen doping of $A_2Nb_4O_{11}$ to obtain $A_2Nb_4O_{11-x}N_x$, wherein $A_2Nb_4O_{11}$ obtained in step 1) is mixed with a nitrogen source and heated, the heated mixture is washed to remove nitrogen source residue adsorbed on the surface of nitrogen doped $A_2Nb_4O_{11}$ and dried.

7. The process of claim 6, wherein the acidic solution used in step 1) is selected from the group consisting of hydrochloric acid, nitric acid, sulfuric acid, and phosphoric acid.

8. The process of claim 7, wherein the acidic solution has a concentration of 1-10 mol/L.

9. The process of claim 8, wherein, in step 1), the ratio of the weight of $A_2Nb_4O_{11}$ to the volume of the acidic solution is from 1 g:10 ml to 1 g:600 ml, and the duration of the immersing is 10-96 hours.

10. The process of claim 6, wherein the nitrogen source is an ammonium salt or a nitrogen-containing organic compound.

11. The process of claim 10, wherein the nitrogen source is urea or ammonium carbonate.

12. The process of claim 6, wherein, in step 2), the weight ratio of $A_2Nb_4O_{11}$ and the nitrogen source is from 1:0.5 to 1:10.

13. The process of claim 6, wherein, in step 2), the heating is performed under a temperature of 300-600° C., and the duration of the heating is 1-10 hours.

14. The process of claim 6, wherein, in step 2), nitrogen doped $A_2Nb_4O_{11}$ is washed with acetone and/or distilled water, and dried under a temperature of 20-300° C. for 10-96 hours.

15. The process of claim 14, wherein nitrogen doped $A_2Nb_4O_{11}$ is washed with distilled water, and dried under a temperature of 20-300° C. for more than 10 hours.

16. A method for degradation of organic pollutants, comprising contacting the organic pollutants with the compound of claim 1.

* * * * *